(12) United States Patent
Stamps et al.

(10) Patent No.: US 6,616,095 B2
(45) Date of Patent: Sep. 9, 2003

(54) COUPLED AIRCRAFT ROTOR SYSTEM

(75) Inventors: Frank B. Stamps, Colleyville, TX (US); James L. Braswell, Jr., Colleyville, TX (US); David A. Popelka, Colleyville, TX (US); Richard L. Bennett, Forth Worth, TX (US); Thomas B. Settle, Jr., Arlington, TX (US); Charles E. Covington, Bedford, TX (US); Cecil E. Covington, deceased, late of Azle, TX (US), by Peggy Covington, legal representative

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 10/053,312

(22) Filed: Jan. 18, 2002

(65) Prior Publication Data

US 2002/0134883 A1 Sep. 26, 2002

Related U.S. Application Data

(60) Provisional application No. 60/269,568, filed on Feb. 16, 2001.

(51) Int. Cl.⁷ .......................... B64C 13/04; B64C 27/39
(52) U.S. Cl. ................ 244/17.13; 244/17.25; 244/228; 416/114
(58) Field of Search ................ 416/114, 115; 244/17.13, 17.25, 17.27, 39, 220, 228

(56) References Cited

U.S. PATENT DOCUMENTS

| | | | | |
|---|---|---|---|---|
| 2,969,117 A | | 1/1961 | Schon ........................ 416/114 |
| 4,027,999 A | * | 6/1977 | Durno ......................... 416/40 |
| 4,445,421 A | * | 5/1984 | Walker et al. ................. 91/186 |
| 4,525,123 A | * | 6/1985 | Curci .......................... 416/115 |
| 5,199,849 A | * | 4/1993 | Leman ........................ 416/114 |
| 6,099,254 A | | 8/2000 | Blaas et al. .................. 416/114 |
| 6,231,005 B1 | * | 5/2001 | Costes ..................... 244/17.25 |

FOREIGN PATENT DOCUMENTS

FR   1505127   12/1967

OTHER PUBLICATIONS

Partial European Search Report for counterpart European Patent Application No. 02075616.9, Nov. 6, 2002.

* cited by examiner

Primary Examiner—Robert P. Swiatek
(74) Attorney, Agent, or Firm—James E. Walton; Hill & Hunn, LLP; Melvin A. Hunn

(57) ABSTRACT

The subject tiltrotor aircraft has three modes of operation: airplane mode, helicopter mode, and transition mode. A tilting mast, which transitions the aircraft between airplane mode and helicopter mode, is controlled by systems that allow selective movement of the rotor blades between the flight modes. A hub couples the rotor blades to the tilting mast such that torque and thrust are transferred, while allowing rotor thrust vector tilting. A main swash plate controls rotor thrust vector direction. Pitch horns are coupled to the rotor blades and the main swash plate via pitch links such that swash plate inputs are communicated to the rotor blades. The pitch links are coupled at "delta-3" values that are not optimum. A feedback swash plate and feedback links receive disk tilting inputs from the rotor blades, and supply inputs to the main swash plate, which compensates for the less than optimum delta-3 coupling.

31 Claims, 9 Drawing Sheets

COUPLED AIRCRAFT ROTOR SYSTEM

This application claims the benefit of U.S. Provisional Application No. 60/269,568, filed Feb. 16, 2001, titled "Coupled Aircraft Rotor System."

BACKGROUND OF THE INVENTION

1. Field of the Invention

The present invention relates in general to propulsion systems for aircraft which are operable in at least a helicopter mode of flight. The present invention has a particular applicability in the field of tilt rotor aircraft which are operable in either an airplane mode of flight or a helicopter mode of flight.

2. Description of the Prior Art

The control systems for helicopters and tilt rotor aircraft are complex electrical and/or mechanical systems. The control systems respond to the pilot's input, but also must accommodate forces acting upon rotor assemblies which are generally outside the control of the pilot. Mechanical control systems typically include a swashplate arrangement which consists of a stationary portion and a rotating portion. Typically, the lower, stationary portion is fixed in position and will not rotate, but has the ability to move up and down and/or tilt in any given direction. This is commonly referred to as the "stationary" or "nonrotating" plate. Pilot inputs alter the vertical position of the stationary plate through the collective control and the tilt of the stationary plate through the cyclic control. The rotating portion of the swashplate arrangement is free to rotate. Of course, pilot inputs to the nonrotating portion are passed through to the rotating portion of the control systems.

In the prior art, the rotating portion is typically connected mechanically to each individual rotor blade. For example, in one type of control system, pitch links are connected to pitch horns which are carried by the rotor blade, thus allowing the rotating plate to alter the blade angle of each rotor blade. However, it is necessary to include in control systems a subsystem which reduces the degree of flapping as much as possible. In the prior art, there are two basic approaches: one is to utilize a delta-3 hinge; the other is to utilize offset pitch horns. In tilt rotor aircraft, it is especially important to counteract the detrimental effects of flapping, especially because the aircraft is capable of very high speed travel, particularly in the airplane mode of flight.

The present invention is directed to an improved control system which may be utilized in a helicopter aircraft or a tilt rotor aircraft which provides better control of flapping than can be obtained with the prior art.

SUMMARY OF THE INVENTION

It is one object of the present invention to provide optimized control over flapping even though the physical configuration of the rotor blades and/or control connections between the rotating and nonrotating portions of the control system are in less than optimum locations.

It is another object of the present invention to provide a mechanical or electromechanical feedback input subsystem which provides a mechanical input to the control system or swashplate assembly which compensates for a less than optimum delta-3 coupling between the rotating and nonrotating portions of a control system.

These and other objects and advantages are achieved as is now described. In one particular embodiment of the present invention, an improved aircraft with tilt rotor assembly is provided. It includes a craft body and a plurality of rotor blades which are subject to three modes of flight operation. In an airplane mode of flight the plurality of rotor blades are in a position which is transverse to the craft body. In a helicopter mode of flight the plurality of rotor blades are in a rotor position which are substantially parallel to the craft body. In a helicopter mode of flight, the direction of flight is controlled by a rotor thrust vector. The aircraft is capable of making an in-flight transition between the airplane mode of flight and the helicopter mode of flight. In this transition mode, the plurality of rotor blades are moved between the rotor disk positions associated with the airplane mode of flight and the helicopter mode of flight. In the preferred embodiment, a tilting mast is utilized to transition between the airplane mode of flight and the helicopter mode of flight. The tilting mast couples the plurality of rotor blades to the craft body and is under the control of systems which allow for the selective moving of the plurality of rotor blades between the three modes of flight. Preferably, a hub is provided for coupling the plurality of rotor blades to the tilting mast in a manner which transfers torque and thrust while allowing tilting of the rotor thrust vector.

A main swashplate is provided for tilting in response to pilot inputs to control the direction of the rotor thrust vector. A plurality of pitch horns are provided. Each pitch horn is mechanically coupled to a particular one of the rotor blades and to the swashplate. The pitch horns communicate swashplate inputs to each of the plurality of rotor blades. This allows the pilot inputs to be passed from the nonrotating portion of the control assembly to the rotating portion of the control assembly. Links are provided which connect the plurality of pitch horns to the main swashplate.

In the present invention, each of the plurality of pitch links is mechanically coupled to a particular one of the plurality of rotor blades by one of the plurality of pitch horns in a particular position which yields a "delta-3" value which is not optimum. A feedback swashplate and cooperating feedback links are provided for receiving disk tilting inputs from a plurality of rotor blades during flight, and for supplying a mechanical input to the main swashplate to compensate for the less than optimum delta-3 coupling between the plurality of pitch horns and the plurality of links.

An alternative embodiment of the present invention allows for compensation for less than optimum delta-3 coupling in an electromechanical control system which utilizes controllable actuators to provide the mechanical coupling between the rotor blades and the swashplate. The controllable actuators may comprise electrically controllable actuators, hydraulic actuators, or electro-hydraulic actuators.

Additionally, the present invention has comparable utility in conventional helicopter aircraft and may be utilized in either mechanical control systems or electromechanical control systems.

The above as well as additional objects, features, and advantages will become apparent in the following description.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of the preferred embodiment when read in conjunction with the accompanying drawings, wherein:

DETAILED DESCRIPTION OF THE INVENTION

Figure 1:
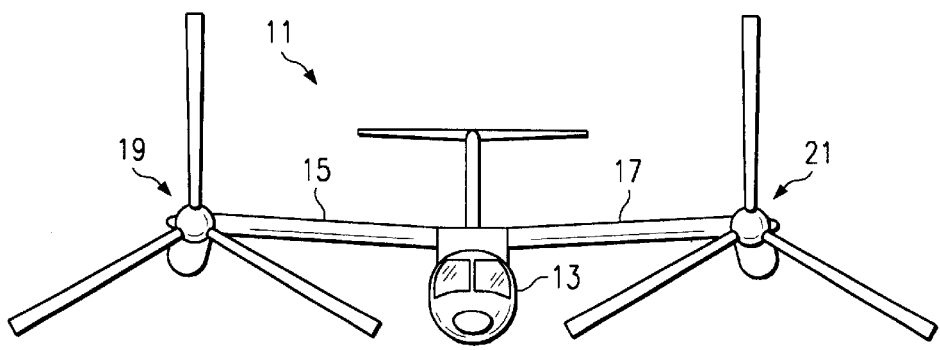
FIGS. 1, 2, and 3 depict one embodiment of the present invention in a aircraft with tilt rotor assemblies.
Figure 2:
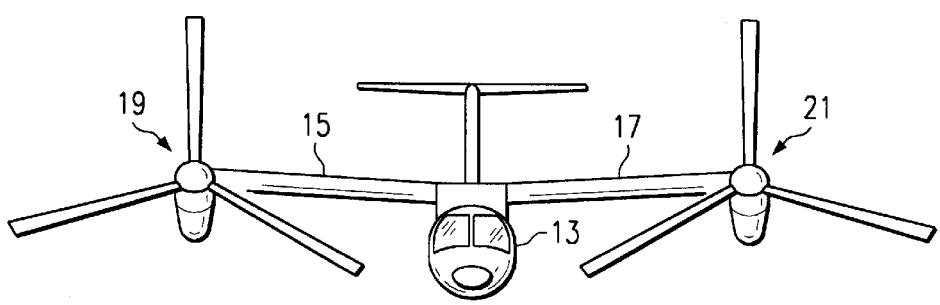
Figure 3:
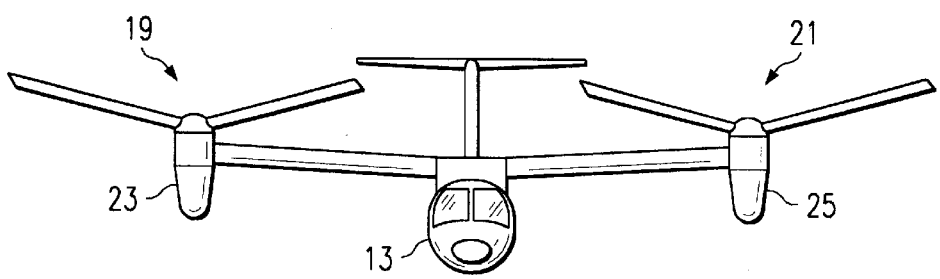

The present invention is directed to improved aircraft and aircraft flight control systems. More particularly, the present invention may be utilized in fixed wing aircraft as well as rotary wing aircraft. The rotary wing aircraft may include conventional helicopters, as well as aircraft with tilt rotor assemblies, such as the aircraft manufactured by Bell Helicopter Textron, Inc. and marketed under the "TILTROTOR" Trademark. Referring now to FIGS. 1, 2, and 3 in the drawings, a Bell Helicopter TILTROTOR aircraft utilizing the present invention in flight is depicted. FIG. 1 depicts a TILTROTOR aircraft 11 in an airplane mode of flight operation. Wings 15, 17 are being utilized to lift craft body 13 in response to the action of propeller assemblies 19, 21. As is shown in the view of FIG. 1, the propeller assemblies 19, 21 are composed of a plurality of rotor blades which are rotated in a rotor disk which is substantially transverse to the craft body 13. In this mode, the rotor assemblies 19, 21 operate as twin engines for the airplane mode of flight. In contrast, FIG. 3 depicts the aircraft 11 in a helicopter mode of flight with rotor assemblies 19, 21 being positioned substantially parallel to the craft body 13. In this view, the pylons 23, 25 are depicted. Pylons 23, 25 rotate in position to allow switching between the aircraft mode of flight and the helicopter mode of flight. FIG. 2 depicts the aircraft 11 in a transition mode with rotor assemblies 19, 21 being shifted in position between that of an aircraft mode of flight and a helicopter mode of flight. One significant advantage of this type of aircraft is the ability to take off and land in a manner like that of a helicopter, but with the ability to travel at relatively high speeds in the manner of an aircraft. The improved control system of the present invention is integrated into a tilt rotor aircraft, such as that depicted in FIGS. 1-3, in order to make the flight operations more stable. This will be discussed in significantly greater detail below.

Figure 4:
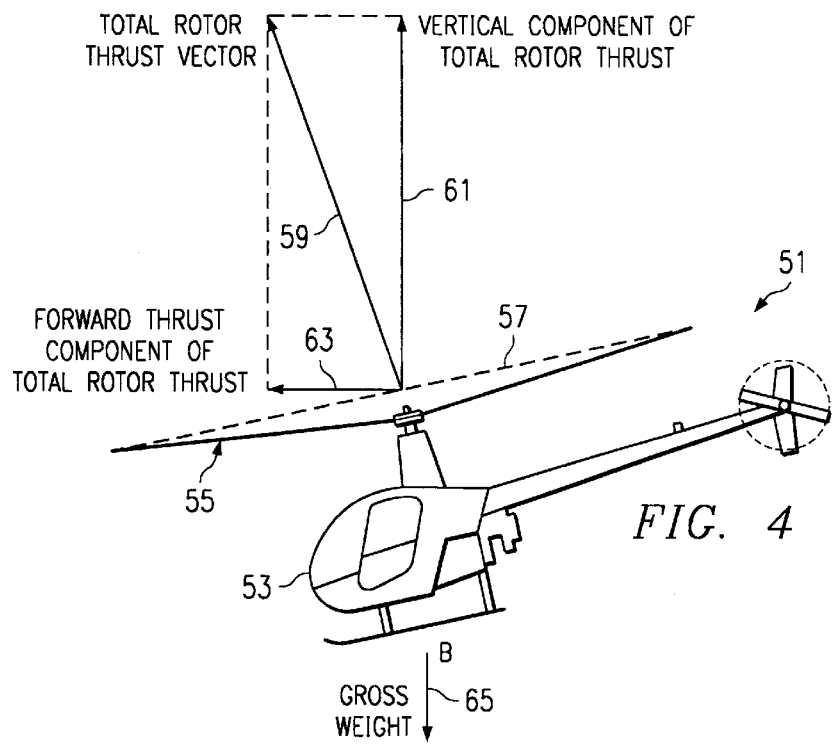
FIG. 4 is a depiction of an alternative embodiment of the present invention which is a conventional helicopter aircraft with an improved control system.

Referring now to FIG. 4 in the drawings, a helicopter in accordance with the present invention which integrates the control system of the present invention is depicted. As is shown, helicopter 51 includes a fuselage 53 and rotor assembly 55. Rotor assembly 55 defines a rotor disk 57 which is substantially parallel to fuselage 53. The motion of helicopter 51 is determined by a rotor thrust vector 59 which is made up of the vertical component 61 and a forward thrust component 63. In the aggregate, the vertical component 61 of the rotor thrust vector 59 must offset the gross weight 65 which pulls downward on fuselage 53. The forward and backward motion of helicopter 51 is determined by the forward thrust component 63 of the total rotor thrust vector 59. In accordance with the preferred embodiment of the present invention, the improved control system is integrated into helicopter 51 in order to stabilize the craft during the helicopter mode of flight. One significant advantage of the present invention is that it allows the utilization of a greater number of rotor blades than is typically utilized in commercial craft. For example, four, five, six, or more blades may be utilized when the present invention is integrated into the helicopter. This is possible because the present invention allows for optimization of feedback systems in order to eliminate the instabilities associated with a delta-3 position or configuration which is less than optimum. This instability is very likely to occur in an aircraft which includes more than three rotor blades. The stabilizing effect of the present invention will be discussed in greater detail below.

Figure 5:
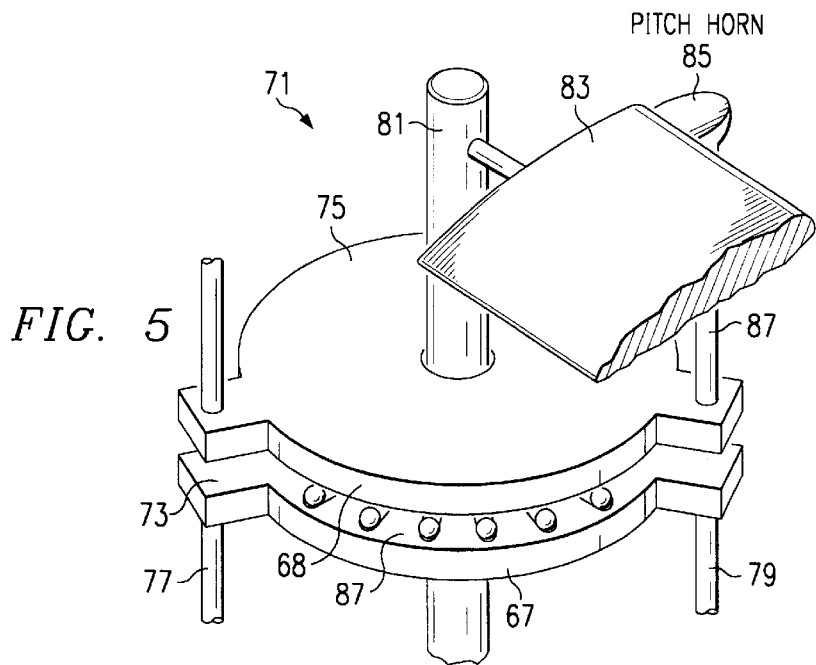
FIG. 5 is a simplified pictorial representation of one mechanical control system for a rotor assembly.

Referring now to FIG. 5 in the drawings, a simplified pictorial representation of a basic mechanical control system for use in a helicopter or tilt rotor aircraft is illustrated. This assembly is known as a "swashplate control system" and it includes a nonrotating portion 67 and a rotating portion 68. A mast 81 extends through the rotating and nonrotating members 67, 68 and is coupled to a plurality of blades, such as blade 83. Each blade is connected through a pitch horn, such as pitch horn 85, and a linkage such as pitch link 87 back to the nonrotating member 67 and to the pilot control systems. A hub is provided which couples the rotor blades to mast 81 in a manner which transfers torque and thrust while allowing tilting of the rotor thrust vector. For example, in a mechanical system, the hub may comprise a gimbaled yoke, but in electromechanical systems may comprise other types of couplings. The hub is not depicted in this view in order to simplify the view.

The control system depicted in simplified form in FIG. 5 allows for the combination of collective control and cyclic control. Both collective control and cyclic control are accomplished through the swashplate arrangement, and the engineering details of the swash pate vary between helicopter designs. As discussed above, the upper portion of the assembly (the rotating portion) is free to rotate relative to the lower, stationary (non-rotating portion). Pilot inputs are provided to alter the vertical position of the stationary plate through the collective control and the tilt of the plate through the cyclic control. Since the rotating plate always follows the orientation of the stationary plate, any pilot input to the stationary plate is passed onto the rotating plate above it. The pitch links and pitch horns are utilized to allow the rotating plate to alter the blade angle of each blade. Pulling the collective lever up moves the swashplate vertically upward so that all blades contain the same increase in blade angle. Similarly, pushing the collective down decreases the blade angle of all blades. Variations in blade angle change the amount of total rotor thrust produced. Accordingly, changes in collective control cause changes in total rotor thrust but they do not alter total rotor thrust orientation.

Figure 6:
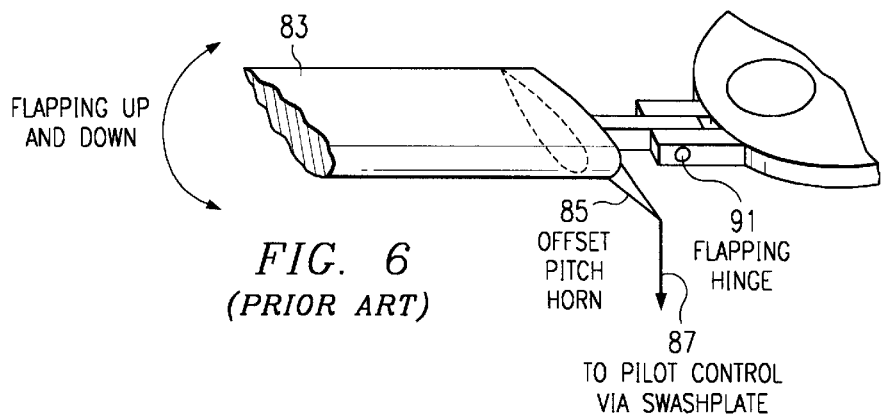
FIGS. 6, 7A, 7B, 7C, and 7D are simplified control representations of prior-art approaches for reducing flapping in a rotor assembly.

Referring now to FIGS. 6, 7A, 7B, 7C and 7D in the drawings, existing prior-art approaches for reducing the flapping of the rotors are depicted. The view of FIGS. 7A–7D is a simplified pictorial representation of the utilization of pitch horns to control flapping. The view of FIG. 6, FIGS. 7A–7D, are simplified pictorial representations of the utilization of delta-3 hinges. As is shown in FIG. 6, a blade 83 may be flapped up or down. It is connected to the hub assembly through flapping hinge 91 which allows the upward and/or downward flapping. As is shown in FIG. 6, an offset pitch horn 85 is coupled to one portion of blade 83. Link 87 is coupled to pitch horn 85 and supplies the flapping input to pilot control through the swashplate (not depicted in this view). In practice, when the blade 83 flaps up, the attachment of the pitch horn 87 to the leading edge of the blade arrests that part of the blade and the blade angle reduces. The reverse holds true when the blade 83 flaps down.

Figure 7A:
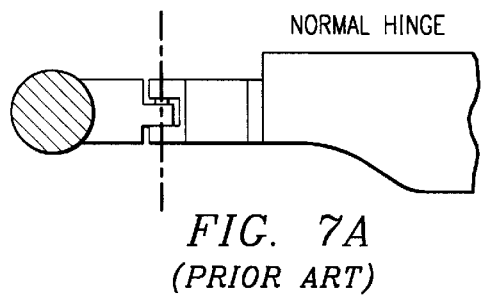
Figure 7C:
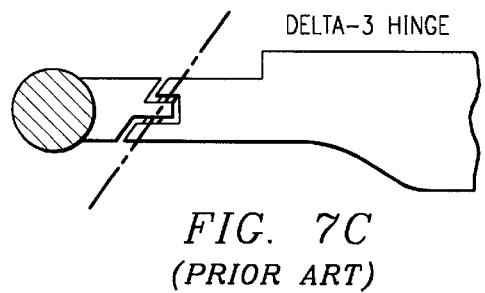
Figure 7B:
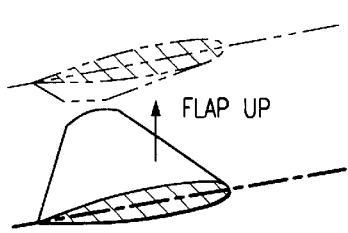
Figure 7D:
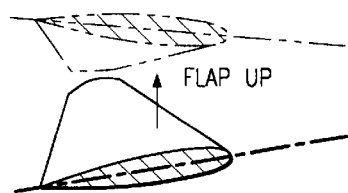

FIGS. 7A–7D depict an alternative to an offset pitch horn, namely the utilization of delta-3 hinges. Delta-3 hinges are set relative to the feathering axis at an angle other than 90 degrees. When the blade flaps up, the pitch angle reduces automatically. The hinge at 90 degrees to the feather axis, in contrast, does not cause any difference to the pitch angle when flapping. In the view of FIGS. 7A and 7B, the blade attaches to the rotor hub with right angle flapping hinges. FIG. 7B shows that flapping up and down has no influence on the pitch angle of the blade. Thus, any alteration in the lift coefficient to eliminate dissymmetry of lift happens solely by flapping up or down. In the view of FIGS. 7C and 7D an alternative is depicted with the flapping hinge at an angle other than 90 degrees. The blade flaps up out of the page, and the trailing edge rises more than the leading edge because of the geometry of the hinge. This is clearly shown in FIG. 7D which depicts the flapping up as being associated with the decrease in pitch angle. This decrease helps reduce the lift coefficient so the blade flaps less to achieve the same result.

Tilt Rotor Aeroelastic Stability Design Issues

A tilt rotor aircraft can achieve very high airspeeds and altitudes when operating in the airplane mode configuration. Existing tilt rotor aircraft have demonstrated airspeeds up to 385 knots and altitudes up to 20,000 feet, with emerging tilt rotor aircraft designs achieving even higher airspeeds. These capabilities offer significant benefits over conventional helicopters, but at the same time, introduce the possibility of new types of aeroelastic instability which are not present in conventional helicopters. Two of the most demanding stability issues are the prop rotor aeroelastic instability and the rotor flap-lag instability. A brief description of each of these stability problems is provided below.

Prop Rotor Aeroelastic Instability

A tilt rotor aircraft can experience a phenomena referred to as prop rotor aeroelastic instability in the airplane mode of flight. This instability is a result of adverse aeroelastic coupling of the rotor system and the wing and pylon system to which it is attached. This instability is a significant design driver, which implies that the requirements for wing structural stiffness and pylon mass properties are typically based on prop rotor aeroelastic stability requirements. If the rotor and wing design parameters are not selected properly, then the prop rotor aeroelastic instability may limit the useable speed range of a high-speed tilt rotor. For this reason, design solutions are sought which maximize the aeroelastic stability with the minimum weight impact.

The prop rotor aeroelastic instability is similar to classical propeller whirl flutter, but it is more complex because a tilt rotor aircraft has a flapping degree of freedom which is not present on a propeller. The rotor flapping degree of freedom causes additional destabilizing forces that can lead to instabilities that are not possible on a conventional propeller.

The physical mechanism for this instability is the destabilizing rotor shear forces that are transmitted to the wing/pylon system in a high-speed airplane flight condition. These destabilizing rotor shear forces are generated as a result of the rotor flapping response to a disturbance such a gust, or a pilot maneuver.

Figure 8:
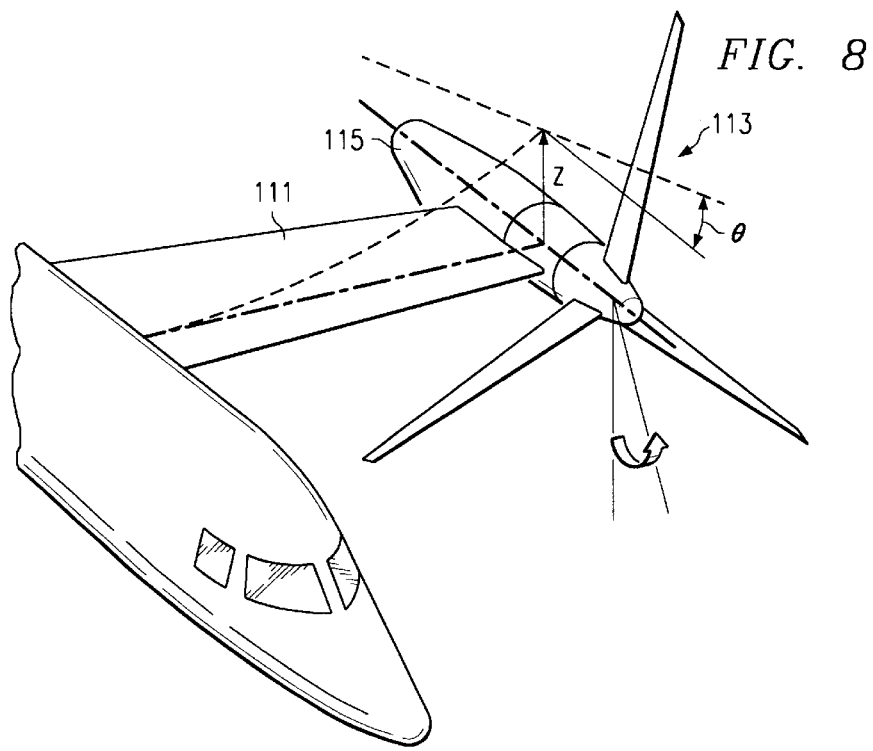
FIG. 8 is a simplified pictorial representation of the response of a wing/pylon/rotor assembly to a disturbance.

Referring now to FIG. 8 in the drawings, a disturbance causing a wing 111 to vibrate at one or more of its fundamental natural frequencies is illustrated. Because the rotor 113 and its control system are attached to the wing 111 and pylon 115, the motion of the wing/pylon 111, 115 changes the angle of attack of the rotor system 113 and causes the rotor system 113 to flap. For a specific rotor design configuration, there exists a range of wing vibration frequencies where the rotor system flapping will create destabilizing hub shears, which are a source of negative damping and negative stiffness, as shown in FIG. 9.

Figure 9:
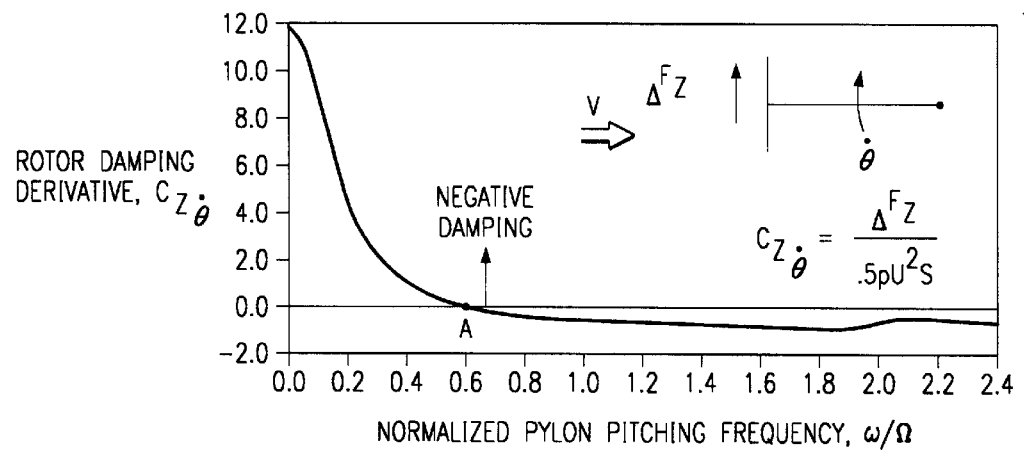
FIG. 9 depicts the causes of prop rotor aeroelastic instability.
Figure 9:
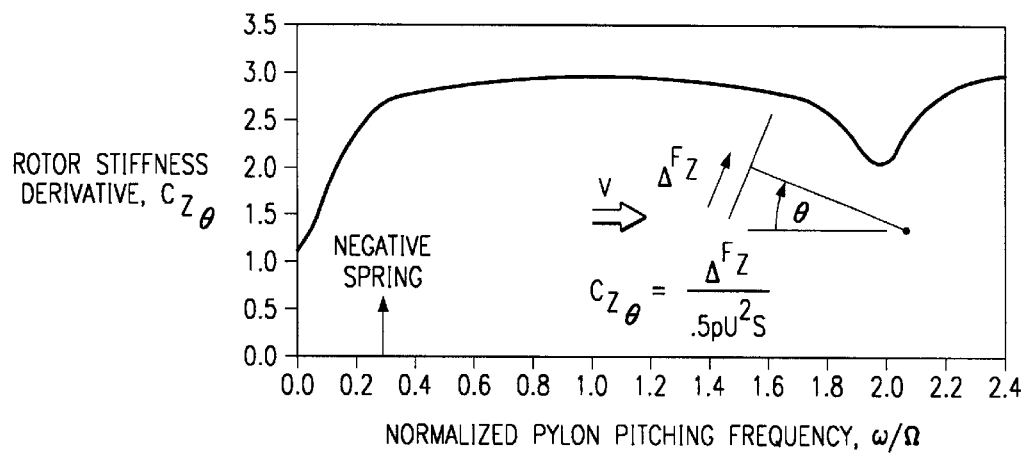
Figure 9:
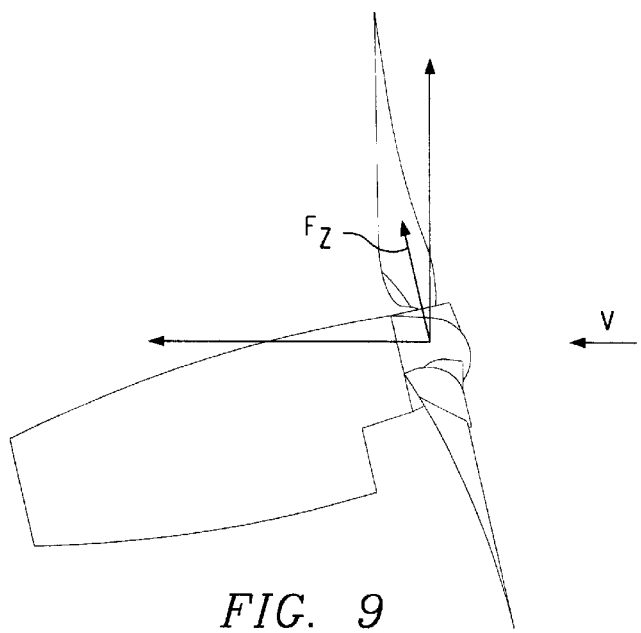

Referring now to FIG. 9 in the drawings, if the wing/pylon is vibrating at frequencies lower than Point A, the rotor system generates negative stiffness and negative damping. The negative damping from the rotor hub shears can overcome the inherent structural damping in the wing/pylon system and eventually lead to an aeroelastic instability in high speed forward flight.

Figure 10A:
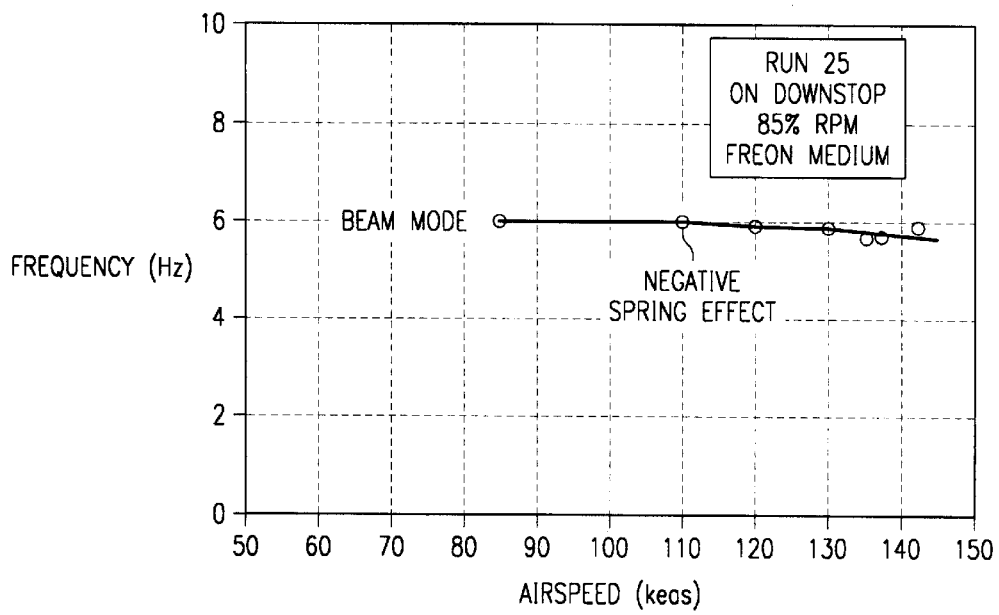
FIGS. 10A and 10B are graphical representations of frequency, dampening, and airspeed, which are measured on a small scale aircraft with tilt rotor assemblies.
Figure 10B:
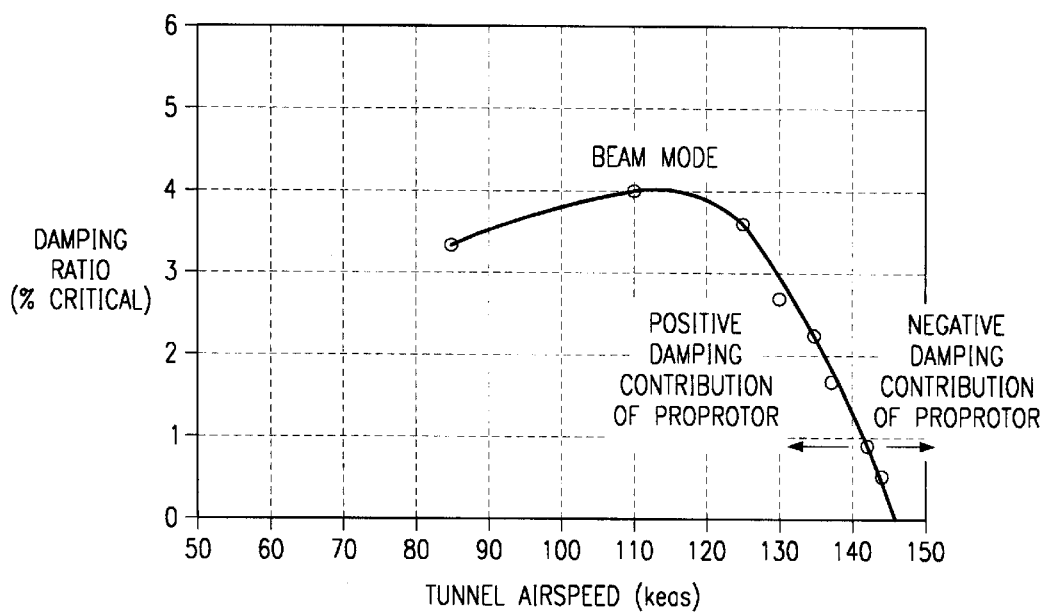

Referring now to FIGS. 10A and 10B in the drawings, plots of measurements from a small scale tilt rotor aeroelastic model are illustrated. In FIG. 10A, a plot of frequency versus airspeed is shown. In FIG. 10B, a plot of damping ratio versus tunnel airspeed is shown. As is shown, at low airspeeds, the rotor system can contribute positive damping and stabilize the aircraft, but at high airspeeds, the rotor creates negative damping, which eventually leads to an instability at speeds above 146 knots (model scale). Several solutions are available to improve the aeroelastic stability of a tilt rotor. The wing/pylon stiffness and mass properties can be tailored to maximize the stability of the system. The rotor system can also be improved by incorporating beneficial rotor frequency tuning, aeroelastic coupling, and by adjusting the kinematics of the rotor controls.

Rotor Flap-Lag Instability

Another instability to be avoided is the rotor flap/lag instability. Unlike the prop rotor aeroelastic instability, the flap/lag instability is confined to the isolated rotor and does not significantly interact with the dynamics of the wing and pylon. This instability is a result of coalescence of the rotor flapping mode frequency and the rotor inplane bending mode frequency. In high speed airplane mode flight, the aerodynamic forces acting on the rotor are very large and can significantly alter the frequency and damping of these two rotor modes. In the case of an improperly designed rotor system, the frequencies of these two rotor modes can approach each other as airspeed is increased. As this occurs, the two modes will strongly interact, and will blend their characteristics to form two highly coupled modes. Each of these coupled modes will be affected by the strong aerodynamic forces; however, one mode will be stabilized while the other mode is destabilized. The rotor design parameters must be properly selected to avoid the coalescence of the rotor modes to prevent the flap/lag instability.

Rotor Pitch Flap Coupling, Delta-3

Figure 11:
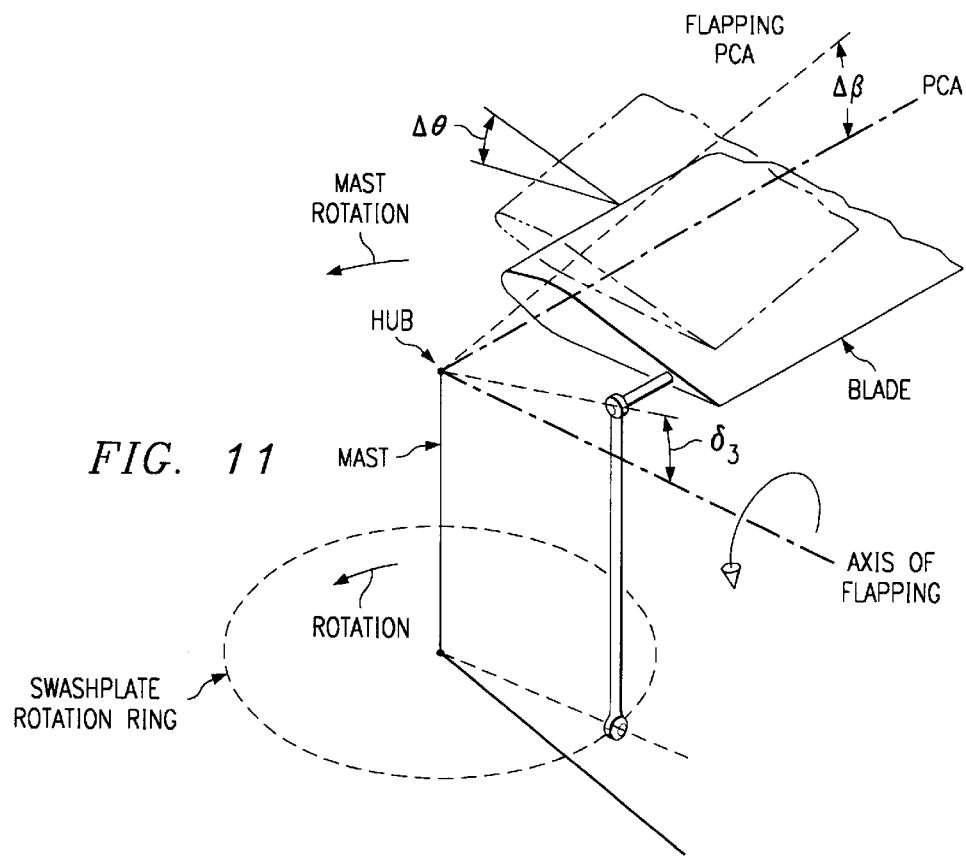
FIG. 11 is a simplified representation of the effect of delta-3 angle in a control system.

One of the most important rotor parameters affecting the aeroelastic stability is the rotor pitch-flap coupling, or delta-3 angle. FIG. 11 shows a schematic of the rotor hub which illustrates the delta-3 angle used on a rotor system. Because one end of the pitch horn is restrained by the pitch link, and the other end is attached to the flapping blade, a pitch change will occur as the blade flaps. Hence, the delta-3 angle produces coupling between rotor flapping and rotor blade pitch. As the rotor blade flaps upward, a rotor system with a positive delta-3 angle will experience a nose-down pitch, while a rotor with a negative delta-3 angle will experience a nose-up pitch. The equation defining the pitch change caused by delta-3 is defined below:

$$\Delta\theta = -\tan(\text{delta-3})\Delta\beta$$

Purpose of Delta-3

The pitch/flap coupling caused by the delta-3 angle alters the aerodynamic forces acting on the rotor, which modifies the flapping frequency. The rotor delta-3 angle is used to reduce rotor flapping amplitudes during gust disturbances or pilot maneuvers. This prevents excessive flapping which can cause high rotor loads and mechanical interferences. On a tilt rotor, the delta-3 angle can be adjusted by moving the location of the pitch horn relative to the flapping axis as shown in FIG. 11. On a three bladed tilt rotor aircraft, the delta-3 angle is usually set to values near −15 degrees, which provides an adequate level of flapping attenuation. Larger values of delta-3 would reduce flapping even more, but this can aggravate the aeroelastic stability problems described above. The influence of delta-3 on aeroelastic stability is described below.

Effect of Delta-3 on Aeroelastic Stability

Because the delta-3 coupling alters the flapping frequency of a rotor, it affects the basic rotor flapping response characteristics, as well as the destabilizing rotor shears. This influences both the prop rotor aeroelastic instability and the rotor flap-lag instability.

For the prop rotor aeroelastic stability problem, large negative values of delta-3 angle will increase the magnitude of the destabilizing rotor hub shears shown in FIG. 9. The increase in negative rotor damping will reduce the stability boundary of the aircraft. Likewise, large positive values of delta-3 are beneficial for prop rotor stability.

Large positive values of delta-3, however, will cause the flapping frequency to increase and approach the rotor inplane mode frequency. This can lead to a rotor flap/lag instability at high speed. Likewise large negative values of delta-3 will improve the rotor flap/lag stability by preventing coalescence of these two rotor modes.

The selected design value of delta-3 is a compromise between the requirement for acceptable flapping reduction, good prop rotor aeroelastic stability, and acceptable flap/lag stability.

Figure 12:
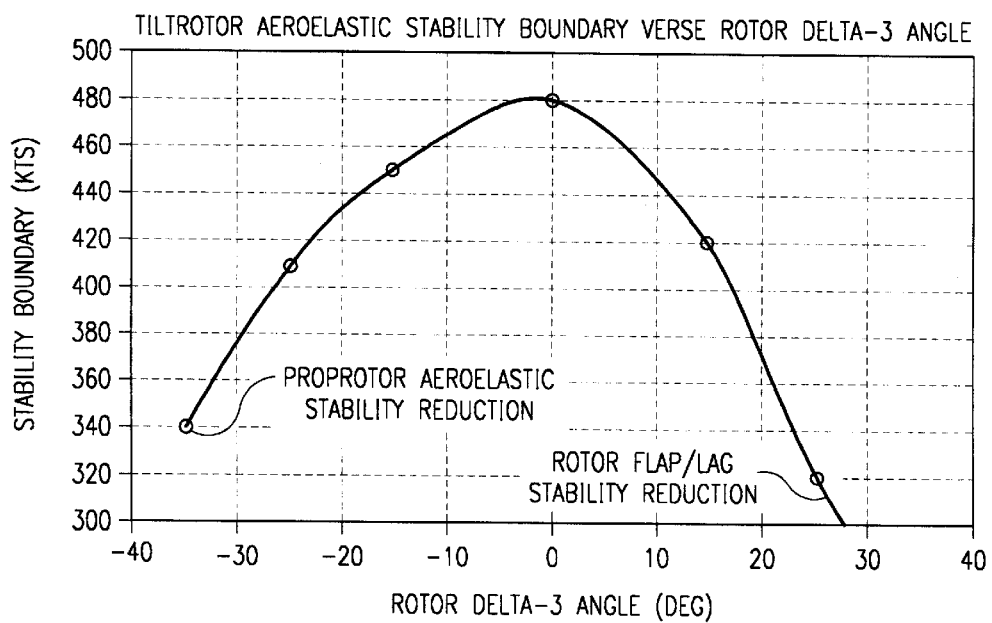
FIG. 12 is a graphical representation of the effect of delta-3 on aeroelastic stability in a tilt rotor aircraft.

Referring now to FIG. 12 in the drawings, a plot of rotor delta-3 angle versus stability boundary is illustrated. FIG. 12 presents the calculated stability boundary for a typical high-speed tilt rotor as the rotor delta-3 angle is varied. As is shown, if the delta-3 angle is set at zero degrees, the stability is optimum, but there is no beneficial reduction in rotor flapping response due to gusts and maneuvers. For large negative values of the delta-3 angle, the prop rotor aeroelastic stability will be degraded significantly. At large positive values of delta-3 angle, the rotor flap-lag instability occurs and seriously limits the useable airspeed range. Thus, a small delta-3 angle near about −15 degrees provides a good compromise between flapping control and aeroelastic stability for a tilt rotor.

Multi-Bladed Tilt Rotor Design Challenge

Figure 13:
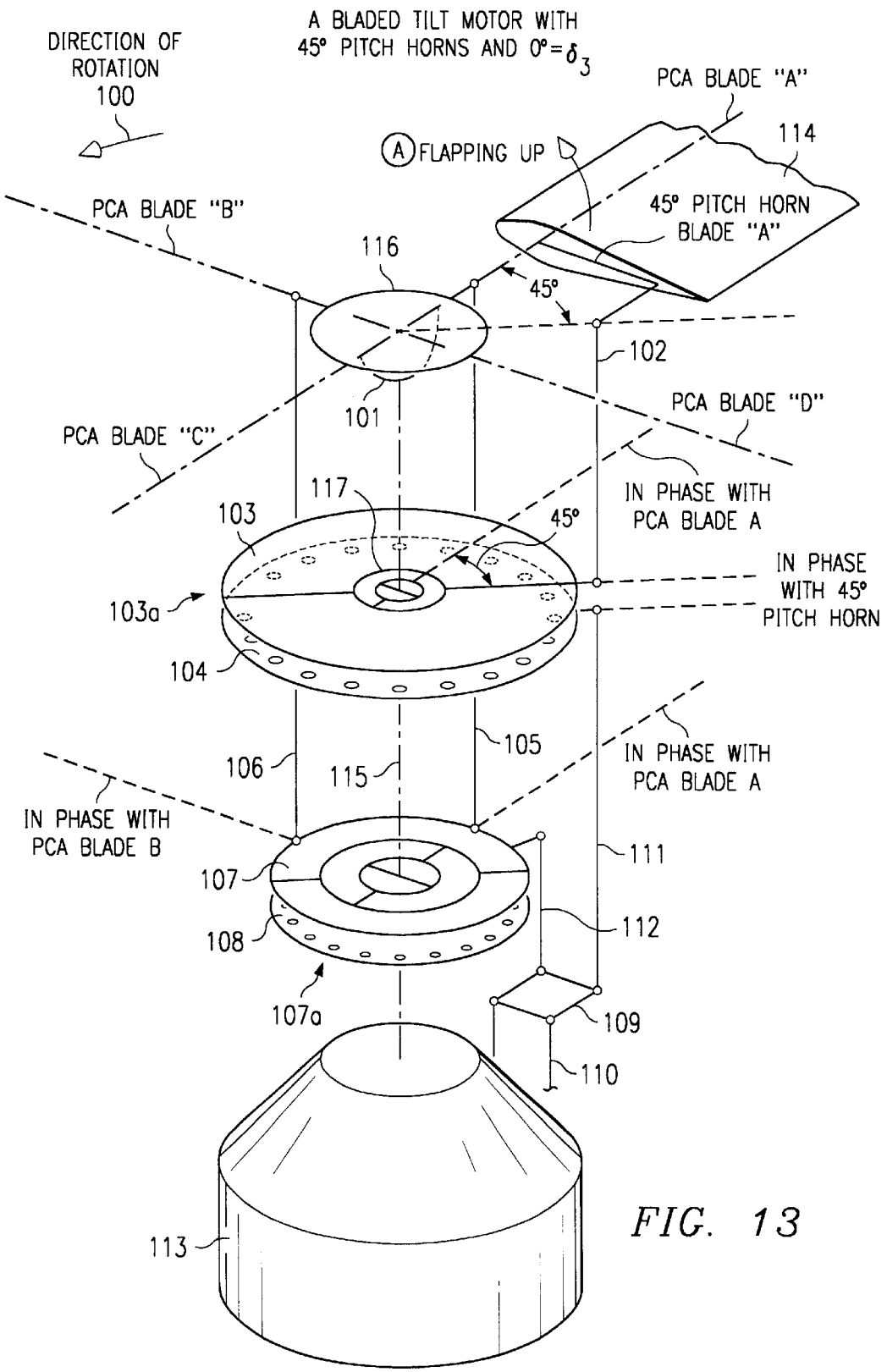
FIG. 13 is a simplified depiction of a mechanical control system which utilizes the present invention.

Referring now to FIG. 13 in the drawings, although a small delta-3 angle near about −15 degrees is convenient for a three bladed tilt rotor, it presents a serious design challenge for a multibladed rotor with four, five, or 6 blades. The hub configuration for these multibladed rotors does not allow the pitch horn to be located at the proper position due to structural interferences, as will be discussed below. In these rotor systems, the delta-3 angle is generally −40 to −50 degrees to allow for pitch horn clearance. These large values of delta-3 angle are devastating to the aeroelastic stability, as shown in FIG. 12 and described above.

Proposed Tilt Rotor Design Solution

The present invention is directed to a technical solution to this problem by permitting a small negative delta-3 angle to be used on a multibladed tilt rotor to maximize the aeroelastic stability, while simultaneously reducing rotor flapping response. The proposed solution can be implemented by either mechanical feedback, or through the use of active control feedback. In either case, the result is the same: the multibladed rotor is designed with a control system arrangement that easily accommodates the pitch horn motions, yet the effective delta-3 angle is adjustable to values near −15 degrees, or any other value desired.

In a mechanical embodiment of the control feedback system, the rotor flapping motion is sensed at the rotor hub through the feedback links which transmit the rotor flapping angle to the feedback swashplate. Thus, the mechanical connections cause the feedback swashplate to tilt through the same flapping angle as the rotor. By using mixing levers, the motion of the feedback swashplate is combined with the pilot control inputs to control the motion of the main swashplate. The main swashplate is connected to the rotor pitch horns through the pitch links. The feedback swashplate provides an extra control input proportional to rotor flapping, and effectively modifies the rotor geometric delta-3 angle. By properly adjusting the position of the feedback links and pitch links, a delta-3 angle of about −45 degrees can be reduced to an effective delta-3 angle of about −15 degrees, or any other desired value.

Another approach is to use electronic flapping feedback to alter the effective delta-3 angle. Flapping sensors are used to measure the flapping angle of the rotor system. This flapping angle is sent to a control algorithm, which drives the position of the rotor swashplate in proportion to the rotor flapping. This feedback to the swashplate motion corrects the rotor flapping response and effectively reduces the delta-3 angle from about −45 degrees to about −15 degree, or to any other value desired.

FIG. 13 depicts one embodiment of the present invention which is a mechanical control system which provides the feedback that is necessary to compensate for less than optimum location of pitch horns in a multi-blade rotor assembly. More particularly, FIG. 13 depicts a four-bladed tilt rotor aircraft assembly in simplified form, with the pitch horn located at about −45 degrees, but with compensation provided through the present invention in order to provide an effective delta-3 angle of zero degrees. In the view of FIG. 13, four rotor blades are shown, and include rotor blades A, B, C, and D, each pitching about a pitch change axis. In the view of FIG. 13, rotor blade A is shown in fragmentary perspective view, including its pitch change axis PCA A; while rotor blades B, C, and D are represented only by their pitch change axes PCA B, PCA C, and PCA D. The direction of rotation is depicted in this view as arrow 100.

Rotor blades A, B, C, and D are coupled together at gimbaled yoke 116. Gimbaled yoke 116 includes a gimbaled hub 101. The gimbaled yoke 116 and gimbaled hub 101 are connected to transmission system 113 through mast 115. A main swashplate assembly 103*a* is located between yoke 116 and transmission system 113. Main swashplate assembly 103*a* includes a main swashplate rotating ring 103 and a main swashplate nonrotating ring 104. Mast 115 connects at swash-plate gimbaled driver 117 to main swashplate assembly 103*a*, and passes upward to connect to gimbaled hub 101 of gimbaled yoke 116. A feedback swashplate assembly 107*a* is located between main swashplate assembly 103*a* and transmission system 113. Feedback swashplate 107*a* is comprised of a feedback swashplate nonrotating ring 107 which is adapted for receiving cyclic input only, and a feedback swashplate rotating ring 108. Feedback swashplate assembly 107*a* is connected through a plurality of feedback links, such as feedback links 105, 106, to the rotor assembly. As is shown, feedback link 105 connects to rotor blade A, and feedback link 106 connects to rotor blade B. Feedback link 105 is "in phase" with the PCA A of rotor blade A, while feedback link 106 is "in phase" with the PCA B of rotor blade B. FIG. 13 also depicts a mixing lever system 109 which receives pilot control inputs 110 and inputs from rotor flapping feedback link 112. The mixing lever system 109 includes a connection which provides input to the main swashplate 103*a* which includes a mixture of the pilot inputs and the feedback inputs. This is shown as link 111 in the view of FIG. 13. Main swashplate assembly 103*a* includes a pitch link 102 that is connected from the main swashplate rotating ring 103 to the pitch horn 114 of rotor blade A. Note that the pitch horn is located at −45 degrees, which is less than optimum for stable flight operations. The input provided by feedback swashplate assembly 107*a* through feedback links 105, 106 provides for an effective pitch horn of zero degrees.

The view of FIG. 13 depicts a system in which the delta-3 for each rotor blade is converted from −45 degrees to zero degrees by feeding back flapping from the rotors into the fixed controls as follows. If the rotor blade A flaps up about gimbaled hub 101, the feedback link 105 is raised, which tilts the feedback swashplate rotating ring 108 by the same angle as the flapping about the gimbaled hub 101. The motion output of nonrotating ring 107 is passed through rotor flapping feedback link 112 to the mixing lever system 109 which transfers the motion output of nonrotating ring 107 to the main swashplate 103*a*. This tilts the main swashplate 103*a* which raises the pitch link 102 to the same amount as the pitch link 102 was raised by the initial upward flapping of rotor blade A. Because the flapping causes no change in blade pitch, rotor blade A has a zero degree delta-3. It is important to note that other delta-3 values can be achieved, including −15 degrees delta-3, by changing the attachment rotor azimuth of feedback links 105, 106. Also note that the pilot can tilt the main swashplate 103*a* by raising or lowering the pilot control inputs 110. There are other mechanical linkages which can also adjust the delta-3 angle. They would typically include a flapping feedback linkage, a mixing lever system, and pilot control inputs.

Figure 14:
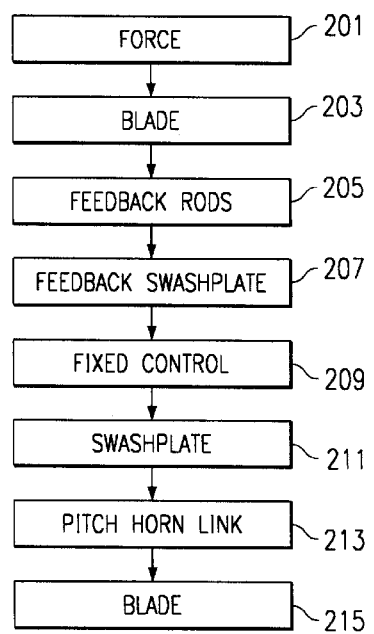
FIG. 14 is a flowchart representation of the manner in which the present invention compensates for flapping forces which act on the rotor blades.

Referring now to FIG. 14 in the drawings, a flowchart representation of the transfer force in the system as is depicted in FIG. 13 is illustrated. As is shown, in the first step of block 201, a force is experienced. The force is then applied to the rotor blade as shown in block 203. The force is then transferred through the feedback rods as is shown in block 205. The feedback rods apply the force to the feedback swashplate as is shown in block 207. The force is transferred through the feedback swashplate through fixed controls as is shown in block 209. The force is applied through fixed controls 209 to the main swashplate as is shown in block 211. The force is then transferred from the main swashplate to the pitch horn link in accordance with block 213. Finally, the force is applied from the pitch horn link to the blade in accordance with block 215.

Figure 15:
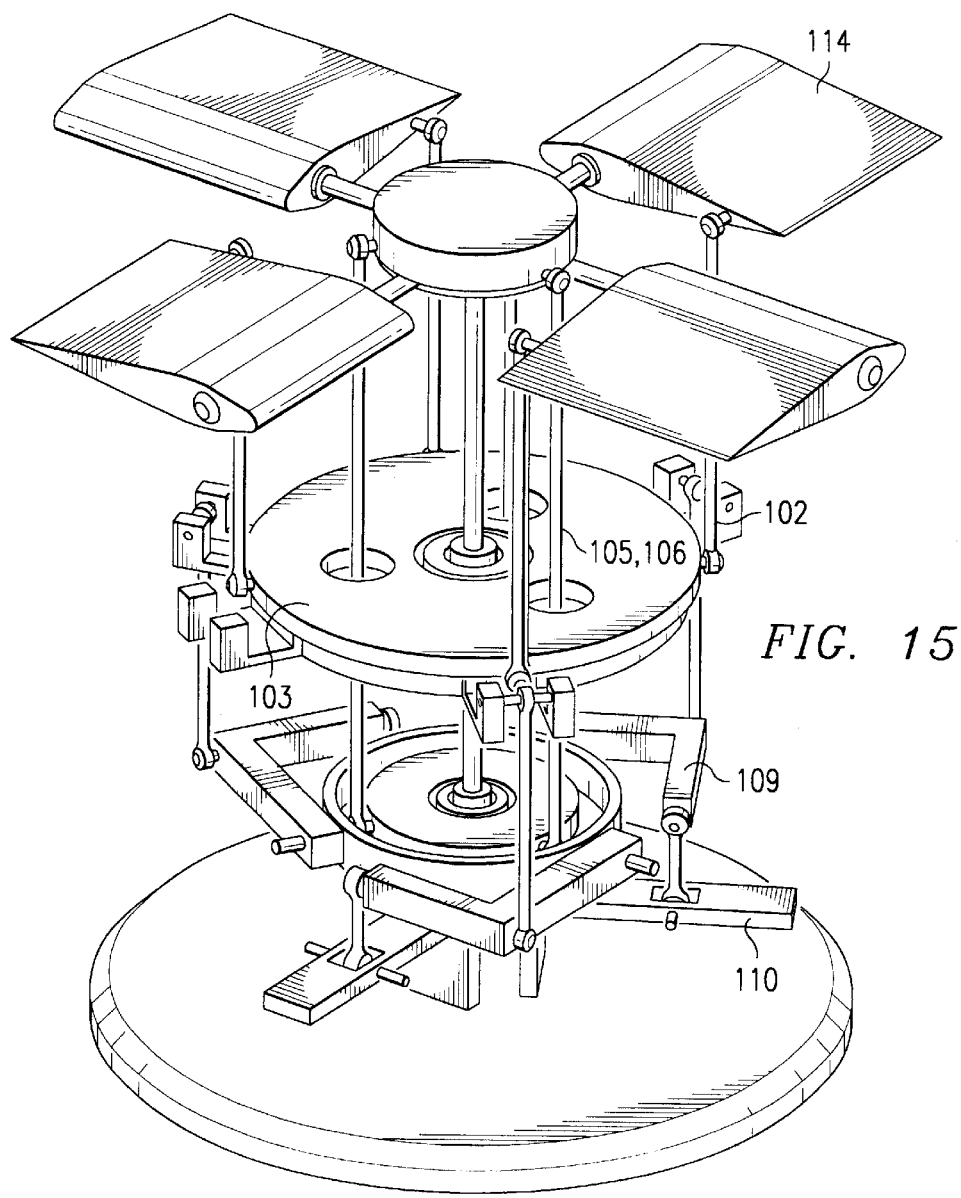
FIG. 15 is a perspective view of one mechanical embodiment of the present invention which is shown in FIG. 14.

Referring now to FIG. 15 in the drawings, a perspective view of the mechanical embodiment of FIG. 13 is illustrated. In order to orient the two figures, pitch horn 114, pitch link 102, main swashplate 103, feedback links 105, 106, mixing lever system 109, and pilot control inputs 110 are marked in the view of FIG. 15.

Figure 16:
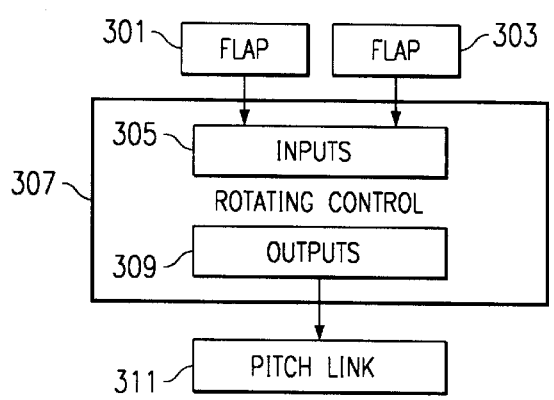
FIG. 16 depicts an alternative electrical control system which utilizes the present invention.

Referring now to FIG. 16 in the drawings, a simplified block diagram representation of an electrical control system which implements the present invention is illustrated. As is shown, flap sensors 301, 303 provide inputs 305 to a rotating control system 307. Rotating control system 307 is a mathematical model which represents the aircraft rotor system. The purpose of rotating control system 307 is to generate outputs 309 that are supplied through pitch links 311 to each rotor blade in order to compensate for a less than optimal delta-3 coupling.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended clams will cover any such modifications or embodiments that fall within the scope of the invention.

What is claimed is:

1. A rotary wing aircraft comprising:
    a fuselage;
    a rotor assembly comprising:
        a mast;
        a yoke coupled to the mast; and
        a plurality of rotor blades coupled to the yoke, each rotor blade having a pitch horn;
    a drive means carried by the fuselage for actuating the rotor assembly; and a control system for controlling the rotor assembly, the control system comprising:
        a plurality of pilot controls for generating a plurality of pilot control inputs;
        a means for modifying the pilot control inputs to compensate for flapping movements of the rotor blades, so as to generate a plurality of main swashplate inputs; and
        a main swashplate coupled to the pitch horns for receiving the main swashplate inputs and correspondingly altering the pitch of the rotor blades.

2. The rotary wing aircraft according to claim 1, wherein the means for modifying the pilot control inputs comprises:
    a feedback swashplate coupled to the rotor blades for receiving the flapping movements of the rotor blades and generating a plurality of flapping inputs; and a mixing system for combining the pilot control inputs and the flapping inputs into the plurality of main swashplate inputs.

3. The rotary wing aircraft according to claim 2, wherein the feedback swashplate is in phase with the main swashplate.

4. The rotary wing aircraft according to claim 1, wherein the control system is an electro-mechanical system.

5. The rotary wing aircraft according to claim 4, wherein the control system further comprises:
controllable actuators for coupling the main swashplate to the pitch horns.

6. The rotary wing aircraft according to claim 5, wherein the controllable actuators are electrically controllable actuators.

7. The rotary wing aircraft according to claim 5, wherein the controllable actuators are hydraulic actuators.

8. The rotary wing aircraft according to claim 5, wherein the controllable actuators are electro-hydraulic actuators.

9. The rotary wing aircraft according to claim 1, wherein each rotor blade is coupled to the yoke with a delta-3 hinge having a delta-3 angle of about −45 degrees.

10. The rotary wing aircraft according to claim 1, wherein each rotor blade is coupled to the yoke with a delta-3 hinge having a delta-3 angle of greater than −15 degrees.

11. The rotary wing aircraft according to claim 1, wherein the plurality of rotor blades is at least four rotor blades.

12. A control system for an aircraft having a plurality of rotor blades coupled to a yoke, the control system comprising:
a plurality of pilot input controls for generating a plurality of control signals;
a main swashplate for controlling a pitch of each rotor blade;
a feedback swashplate operably associated with the rotor blades for generating feedback signals corresponding to flapping movements of the rotor blades; and
a signal mixer for combining the control signals and the feedback signals into a combined signal;
wherein the combined signal is transferred from the signal mixer to the rotor blades through the main swashplate, thereby compensating for the flapping movement of the rotor blades.

13. The control system according to claim 12, wherein the feedback swashplate is operably associated with the rotor blades through a plurality of controllable actuators.

14. The control system according to claim 13, wherein the controllable actuators are electrically controllable actuators.

15. The control system according to claim 13, wherein the controllable actuators are hydraulic actuators.

16. The control system according to claim 13, wherein the controllable actuators are electro-hydraulic actuators.

17. The control system according to claim 12, wherein the feedback swashplate is selectively aligned with the main swashplate.

18. A control system for a rotary wing aircraft having a fuselage, a rotor assembly including a mast, a yoke coupled to the mast, a plurality of rotor blades coupled to the yoke, each rotor blade having a pitch horn, and a drive means carried by the fuselage for actuating the rotor assembly, the control system comprising:
a plurality of pilot controls for generating a plurality of pilot control inputs;
a means for modifying the pilot control inputs to compensate for flapping movements of the rotor blades, so as to generate a plurality of main swashplate inputs; and
a main swashplate adapted to be coupled to the pitch horns for receiving the main swashplate inputs and correspondingly altering the pitch of the rotor blades.

19. The control system according to claim 18, wherein the means for modifying the pilot control inputs comprises:
a feedback swashplate adapted to be coupled to the rotor blades for receiving the flapping movements of the rotor blades and generating a plurality of flapping inputs; and
a mixing system for combining the pilot control inputs and the flapping inputs into the plurality of main swashplate inputs.

20. The control system according to claim 19, wherein the feedback swashplate is in phase with the main swashplate.

21. The control system according to claim 18, wherein the control system is an electro-mechanical system.

22. The control system according to claim 18, wherein the control system further comprises:
controllable actuators for coupling the main swashplate to the pitch horns.

23. The control system according to claim 22, wherein the controllable actuators are electrically controllable actuators.

24. The control system according to claims 22, wherein the controllable actuators are hydraulic actuators.

25. The control system according to claim 22, wherein the controllable actuators are electro-hydraulic actuators.

26. The control system according to claim 18, wherein each rotor blade is coupled to the yoke with a delta-3 hinge having a delta-3 angle of about −45 degrees.

27. The control system according to claim 18, wherein each rotor blade is coupled to the yoke with a delta-3 hinge having a delta-3 angle of greater than about −15 degrees.

28. The control system according to claim 18, wherein the plurality of rotor blades is at least four rotor blades.

29. A rotary winged aircraft comprising:
a craft body;
a plurality of rotor blades in a rotor disk position substantially parallel to the craft body with direction of flight begin controlled by a rotor thrust vector;
a hub coupling through a flexible joint the plurality of rotor blades to the tilting mast in a manner which transfers torque and thrust while allowing rotor thrust vector tilting;
a main swashplate for tilting in response to operator input to control the direction of the rotor thrust vector;
a plurality of pitch horns, each mechanically coupled to a particular one of the plurality of rotor blades and to the main swashplate, for communicating swashplate inputs to each of the plurality of rotor blades, wherein each of the plurality of pitch horns is mechanically coupled to a particular one of the plurality of rotor blades in a particular position which yields a delta-3 value which is not optimum; and
a feedback swashplate and cooperating feedback links for receiving rotor disk position inputs from the plurality of rotor blades during flight, and for supplying mechanical inputs to the main swashplate to compensate for the less than optimum mechanical coupling between the plurality of pitch horns and the plurality of rotor blades.

30. A rotary winged aircraft comprising:
a craft body;
a plurality of rotor blades in a rotor disk position substantially parallel to a longitudinal axis of the craft body with direction of flight being controlled by a thrust vector;

a yoke coupling through a flexible joint the plurality of rotor blades to a tilting mast in a manner which transfers torque and thrust while allowing thrust vector tilting;

a main swashplate for tilting in response to operator inputs to control a pitch of the plurality of rotor blades which control the direction of a thrust vector, and for moving upward and downward coactively to modify a length associated with the thrust vector;

a plurality of controllable actuators mechanically coupling the plurality of rotor blades to the swashplate for supplying mechanical input to each of the plurality of rotor blades; and a feedback control module for receiving displacement data from the plurality of rotor blades during flight, and for supplying displacements through actuation of the plurality of controllable actuators to the plurality of rotor blades to compensate for a less than optimum delta-3 coupling of the plurality of rotor blades.

31. A method of compensating for flapping movements of rotor blades in rotary wing aircraft, the method comprising the steps of:

coupling a main swashplate to a pitch horn of each rotor blade;

operably associating a feedback swashplate with the rotor blades;

generating feedback signals corresponding to flapping movements of the rotor blades with the feedback swashplate;

capturing a plurality of control signals from a pilot;

combining the control signals and the feedback signals into combined signals with a signal mixer; and transferring the combined signals from the signal mixer to the rotor blades through the main swashplate, thereby compensating for the flapping movement of the rotor blades.

* * * * *